M. H. ALBERGER.
Eye Bar for Bridges, &c.
No. 201,860. Patented April 2, 1878.
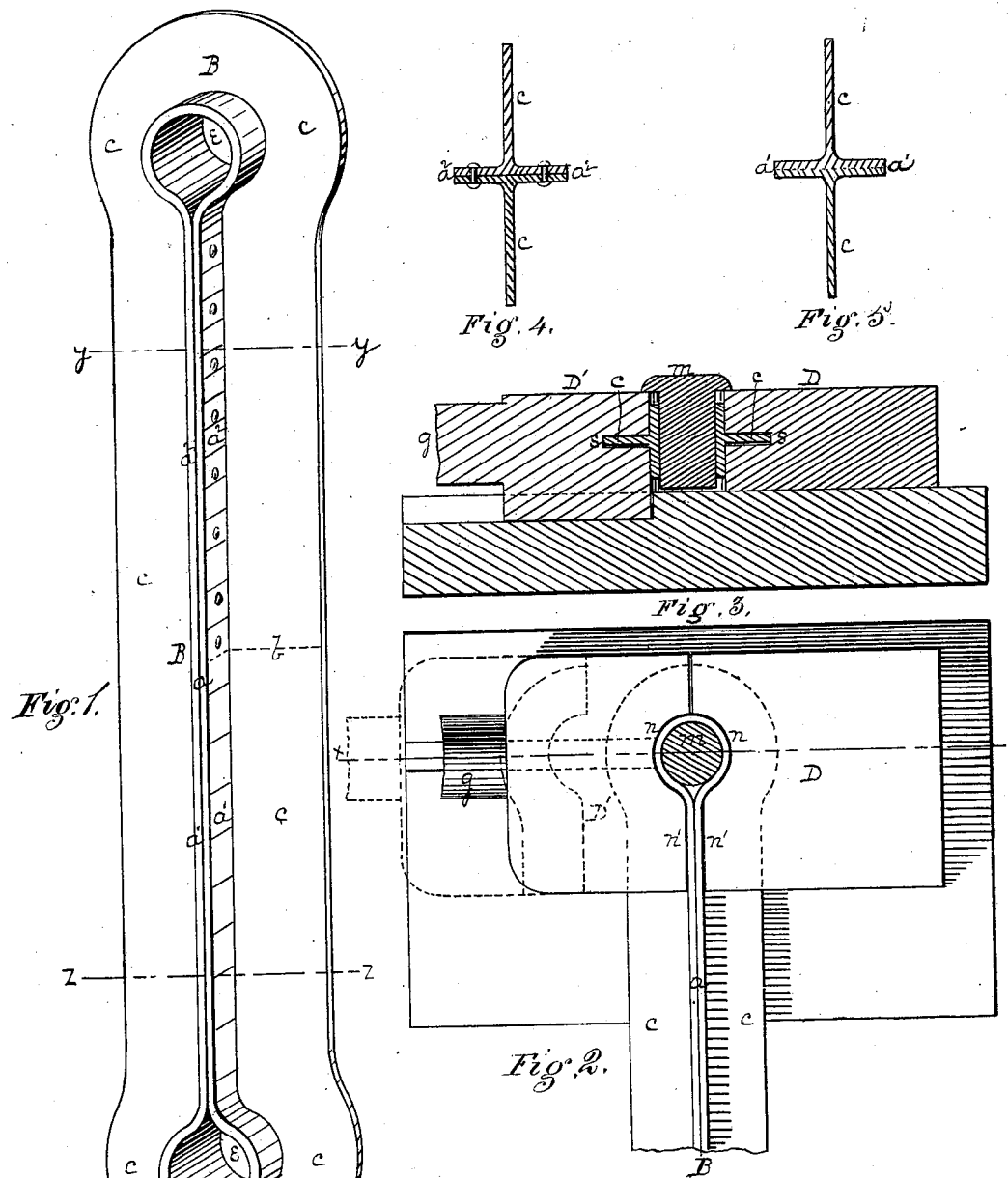
Witnesses
Francis L. Clark
Claudius L. Parker
Inventor Morris H. Alberger,
By Attorney George H. Christy

UNITED STATES PATENT OFFICE.

MORRIS H. ALBERGER, OF PHILADELPHIA, PENNSYLVANIA.

IMPROVEMENT IN EYE-BARS FOR BRIDGES, &c.

Specification forming part of Letters Patent No. 201,860, dated April 2, 1878; application filed February 12, 1878.

*To all whom it may concern:*

Be it known that I, MORRIS H. ALBERGER, of Philadelphia, county of Philadelphia, State of Pennsylvania, have invented or discovered a new and useful Improvement in Eye-Bars; and I do hereby declare the following to be a full, clear, concise, and exact description thereof, reference being had to the accompanying drawing, making a part of this specification, in which like letters indicate like parts.

Figure 1 is a perspective view of my improved eye-bar. Fig. 2 is a plan view of a pair of dies suitable for completing the bending and shaping of the eye part of the bar at each end, and showing the end of the bar in position and the center-pin in section. Fig. 3 is a sectional view of the dies, eye, and center-pin in the vertical plane of the line $x\ x$, Fig. 2; and Figs. 4 and 5 are transverse sectional views through the bar in the lines $y\ y$ and $z\ z$, Fig. 1, respectively.

In building bridges and other like heavy structures, bars with an eye in each end are largely used in places where they are subject to great tensional or torsional strain. Such bars, known under various names of "eye-bars," "connecting-links," "hangers," "stirrups," &c., are necessarily made large and heavy, so that all material which goes to make one part stronger than another involves not only a waste of material, but also increases by so much the weight of the structure without any compensating increase of strength.

In my present improvement I make use of ordinary T-iron of good quality. Knowing the length of the eye-bar B to be made, I take a bar of T-iron of at least twice that length, or a little more than twice the length, measuring from end to end, and following the curvature of the eye-holes, and, having heated it to a good bending-heat, bend the eyes $e$ with the head or flat face of the T inside, and close the ends down, so that the flat faces of the T-heads shall come face to face, and the extreme ends, coming together at any point between the eyes, as at $b$, may be welded together by either a butt-weld or a lap-weld joint.

In making such bend I first bend one end of the bar around so that it shall be parallel, or nearly so, with the body of the bar, and so that the curve or bend shall give approximately or exactly the outer half of the eye. I then place such bent end between a pair of dies, D D', substantially such as are shown in Figs. 2 and 3, and one at least of which is movable. These dies have each a concave seat, $n$, and parallel extensions $n'$ of suitable form to close in on the partially-formed eye, and close down the parallel projecting arms of the bar around a center-pin or mandrel, $m$, and thereby complete the bend or curvature of the eye around the center-pin, and bring the arms of the bar together immediately outside the eye thus formed; and the heat and pressure or force of the swaging blow which the moving die receives may be such as to weld the bars or arms thus brought face to face at that point. Each die has also a longitudinal groove, $s$, of suitable size and shape to afford a seat for the shank of the T, or what, in the finished bar, is mechanically a flange or rib, $c$, so as thereby to aid in and facilitate the bending operation above described.

As shown in the drawing, one die, D, is fixed in position, and the other, D', is movable; but both may be made movable, if so preferred.

The movable die is made with a stem, $g$, which is connected with or may constitute the plunger of a hydraulic press, so as to be operated with the necessary degree or amount of force; but other means of operating the movable die may be substituted, if so preferred. A like eye is then to be made at the proper point toward the other end of the bar in like manner. The ends being welded, as above stated, the T-heads $a\ a$ of the folds of the bar may be welded together in any suitable way, as represented at $a^1$, or they may be bolted or riveted, as shown at $a^2$. The shank $c$ of the T then forms a strengthening-rib, which projects from and extends along both sides of the compound bar thus made, as also around the outer periphery of each eye, as represented in Fig. 1.

It will be observed that the eye-bar thus made has an equal amount of material in cross-section at all points; that the disposition of the material is such as to give great strength; and that the bar is easily, cheaply, and quickly made without the necessary use of the heavy machinery required in upsetting, or in plating and drilling and punching, since the bending power required in bending a hot bar need not necessarily be great.

While I have described my invention solely in reference to its use with iron bars, I do not limit myself to such material, since it may be advantageously used with steel bars, or bars of combined iron and steel, or with bars of "homogeneous metal," so called.

The superior qualities of combined iron and steel are well known in the art. By making a steel T-bar with a light layer of iron along the outer face of the T-head, a connecting-link or eye-bar can be thus made with a solid weld extending from eye to eye. Such an eye-bar would be substantially a solid steel bar, and, of course, would possess the desirable qualities of such material in the use for which it would be designed.

The size of the T-shank or of the flange $c$ is not material, except that the more it is reduced in size the less advantageous will it be as an element of strength in the product made. It will come within what I claim as my invention, to leave the ends of the bar at $b$ unwelded, and splice them by flat or angle iron, or steel fish-plates, though I consider such connection on some accounts objectionable; also, the outer end of the eyes $e$ may each be reenforced, if found necessary, by plating or riveting; or other like modifications or additions may be made without any substantial departure from the invention. The folds between the eyes may thus be at a little distance apart, being held in proper relationship by distance-pieces, as is usual in other structures designed for like uses.

I claim herein as my invention—

An eye-bar consisting of a double T-body between the eyes and a single T around and forming the eyes, substantially as described.

In testimony whereof I have hereunto set my hand.

MORRIS H. ALBERGER.

Witnesses:
J. J. McCORMICK,
GEORGE H. CHRISTY.